Figure 1:
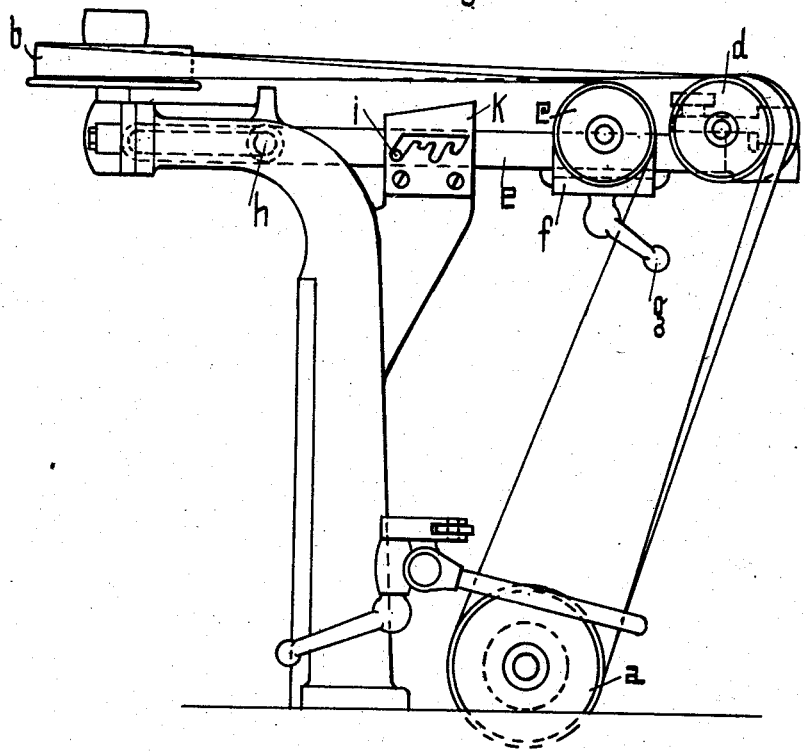

F. B. FISCHER.
BELT GEARING.
APPLICATION FILED JAN. 24, 1911.

994,507.

Patented June 6, 1911.

UNITED STATES PATENT OFFICE.

FRIEDRICH BERNHARD FISCHER, OF DRESDEN, GERMANY.

BELT-GEARING.

994,507.                     Specification of Letters Patent.      Patented June 6, 1911.

Application filed January 24, 1911. Serial No. 604,501.

*To all whom it may concern:*

Be it known that I, FRIEDRICH B. FISCHER, a subject of the German Empire, and a resident of Dresden, Kingdom of Saxony, German Empire, have invented certain new and useful Improvements in Belt-Gearing, of which the following is a specification.

This invention relates to a belt gearing for stepped pulleys running at an angle and is particularly adapted for drilling machines. In this mechanism the adaptation of the path of the belt and of its length to the several conditions resulting from the stepping of the pulleys is effected without specially adjusting the belt tension on each occasion, owing to the fact that a bar carrying both guide rollers, pivoted to swing in a vertical plane and also adjustable longitudinally, is adjustable into predetermined positions and one of the two guide rollers is adjustable into predetermined positions relatively to the vertical plane of the belt drive by pivoting its bearing around a vertical stud. In this connection the alteration in the level of the bar effects the adaptation of the belt path to the steps of the driven pulley which are located in different horizontal planes, the displacement of the bar thereby entailed effecting the adjustment of the length of the belt for the drive for the time being, while the pivoting of one of the guide rollers guides the belt correctly for all drives. In this manner the transition from one drive to another is rendered very smooth. It is only necessary to bring the bar into the predetermined position by simultaneously shifting and raising or lowering and also rotating the pivoted guide roller into its predetermined position. Adjustment of the tension of the belt at each change of drive is not necessary as the belt is automatically maintained at the same tension for all the drives. However, in order to allow for any desired alteration of the tension, as in the case of belt stretch, the second guide or jockey roller is adjustable on the bar. Adjustment on passing from one drive to another is not necessary.

It is of course known in detail to shift both guide rollers horizontally in common and to adjust them or at least one of them as to level and also to adjust the guide rollers or at least one of them by pivoting in the horizontal plane, for the various drives. In the present invention, however, the known separate or detail adjustments can be effected in common owing to the fact that the bar carrying the two guide rollers is adjustable both vertically and horizontally, while its positions and those of the pivoted guide rollers are predetermined and these guide rollers are of such a width that they afford the necessary support to the belt during any drive. As regards the bar the adjustment is predetermined owing to the fact that it is engaged by means of a bolt in notches of different position and level, while as regards the pivoted guide roller the adjustment is fixed by means of a rotatable prism, the faces of this prism which are located at different distances from the axis of rotation serve as stops for the roller support rotatable on a vertical pivot.

Figure 2:
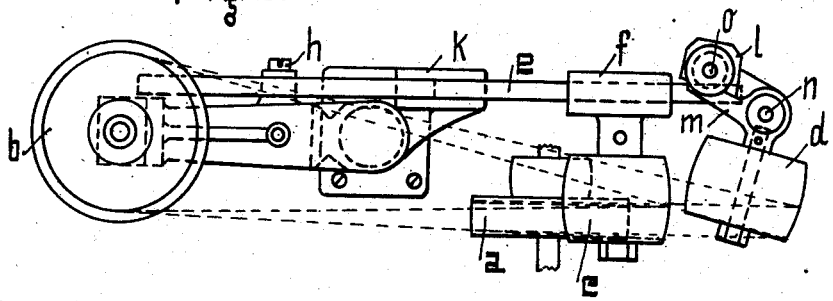

An embodiment of the invention is illustrated in its application to a drilling machine by way of example in the accompanying drawing, in which:

Figure 1 is a side elevation, and Fig. 2 is a top view.

In the drawing $a$ indicates the driving stepped pulley and $b$ the driven pulley. From the driving pulley the belt is first of all carried over the jockey roller $c$, then over the driven stepped pulley $b$ and finally over the pivoted broad-faced belt pulley or guide roller $d$ to the driving stepped pulley $a$. The jockey roller and also the guide roller are mounted on a roller support or bar $e$. The jockey roller $c$ is mounted on a slide $f$ displaceable and adapted to be secured upon the bar forming the roller support. The slide is secured by tightening a clamp $f$ by means of a handle $g$. The roller support is rockable about the bolt $h$ in the vertical plane. In addition, this support is adjustable longitudinally on the bolt $h$, for which purpose the said bolt passes through a slot of sufficient length which is provided in the bar $e$. The bar is secured in the required position for the time being by a pin $i$ fixed to it and adapted to engage in one of the notches of a bearing member $k$ mounted on the frame. These notches are staggered relatively to each other. By the longitudinal displacement of the roller support the belt is always brought back to the necessary tension, the interval between the notches in the longitudinal direction being adapted for obtaining the necessary adjustment. The roller support is rocked in the vertical plane simultaneously, because in the case of the driven stepped pulley the level of the belt varies and if the guide roller *d* were stationary the lower edge of the belt would slip on the lower step of the driven pulley when the belt is carried over the upper step of the driven pulley. Accordingly the notches are staggered relatively to each other not only in their order but also in level. In the case of the drilling machine which is illustrated by way of example, the driving pulley and the driven pulley have each two steps. Accordingly four notches are provided. The number of notches corresponds to the sum of the number of steps on the driving and driven pulleys. The jockey roller *c* maintains a constant position relatively to the roller support and is only shifted upon it when in course of time the belt has stretched and additional adjustment is therefore necessary.

The broad-faced guide roller or belt pulley *d* is rockable on the support or bar *e* in the horizontal plane around the vertical bolt *n*. A four-sided prism *l* is rotatable about the vertical bolt *o*. Each of its sides can serve as a stop for an arm *m* rockable with the guide roller. The four sides of the prism are so formed, having regard to their distance from the center of rotation of the prism and their obliquity that when the proper side of the prism is selected the guide roller *d* is so adjusted by the bearing of the arm *m* against this side that the belt assumes a position upon it which corresponds to the direction of the pull of the belt. The belt therefore adjusts itself automatically on the guide roller *d*, as according to the selection of the steps on the driving and driven pulleys over which it is carried, it alters its position on the guide roller *d*. In the position illustrated in which the belt is carried over the two pulley steps of large diameter, the belt is situated in proximity to one edge of the guide roller *d*. If the large step of the driving pulley *a* be used the belt will run on the outer half of the periphery of the broad-faced pulley *d*, and if the small step of said driving pulley *a* be used, the belt will run on the inner half of the periphery of said broad-faced pulley *d*. Merely by rotating the prism that side of the prism corresponding to the position for the time being of the belt upon the stepped pulleys would be presented to the arm *m* as a stop. The number of sides of the prism corresponds to the product of the number of steps on the driving and driven pulleys. Owing to the automatic adjustment of the belt on the guide roller *d* in the direction of the pull of the belt it is impossible for the edges of the belt to become wedged or slip on the steps of the driving or driven pulleys.

Having now particularly described and ascertained the nature of my said invention and in what manner the same is to be performed, I declare that what I claim is:—

1. In a belt gearing for angle drives of stepped pulleys, the combination of stepped pulleys at different angles, a supporting frame, a pivoted slidable bar, a guide pulley supported thereon, a swiveled bearing mounted on said bar, a guide pulley therein, a belt engaging said pulleys, stop mechanism for holding said bar in different predetermined positions and stop means for holding said swiveled guide pulley in different predetermined positions relative to the position of said bar.

2. In a belt gearing for angle drives of stepped pulleys, the combination of stepped pulleys at different angles, a supporting frame, a pivoted slidable bar, a guide pulley supported thereon, a swiveled bearing mounted on said bar, a guide pulley on said bearing, a belt engaging said pulleys, stop means for holding said bar in different predetermined positions and stop mechanism for holding said swiveled guide pulley in different predetermined positions relative to the position of said bar, said guide pulleys being of greater width than said belt.

3. In a belt gearing for angle drives of stepped pulleys, the combination of stepped pulleys at different angles, a supporting frame, a pivoted slidable bar, an adjustable guide pulley supported thereon, a swiveled bearing mounted on said bar, a guide pulley on said bearing, a belt engaging said pulleys, stop means for holding said bar in different predetermined positions and stop means for holding said swiveled guide pulley in different predetermined positions relative to the position of said bar.

4. In a belt gearing for angle drives of stepped pulleys, the combination of stepped pulleys at different angles, a supporting frame, a pivoted slidable bar, a guide pulley supported thereon, a swiveled bearing mounted on said bar, a guide pulley on said bearing, a belt engaging said pulleys, stop means for holding said bar in different predetermined positions consisting of a pin on said bar and notches on its supporting frame, and stop means for holding said swiveled guide pulley in different predetermined positions relative to the position of said bar.

5. In a belt gearing for angle drives of stepped pulleys, the combination of stepped pulleys at different angles, a supporting frame, a pivoted slidable bar, a guide pulley supported thereon, a swiveled bearing mounted on said bar, a guide pulley on said bearing, a belt engaging said pulleys, stop means for holding said bar in different predetermined positions and stop mechanism for holding said swiveled guide pulley in different predetermined positions relative to the position of said bar, said stop mechanism comprising an arm connected with said swiveled bearing and an adjustable cam plate having a plurality of angular stop faces adapted to engage said bar in different positions thereof.

6. A belt gearing comprising driving and driven pulleys disposed at different angles, one of said pulleys being a cone or stepped pulley, a pivoted slide bar, means for holding said bar in various longitudinal and pivotal adjustments, a pulley supported on said bar, a supplemental pulley, and a belt engaging said pulleys.

7. A belt gearing comprising driving and driven pulleys disposed at different angles, one of said pulleys being a cone or stepped pulley, a pivoted slide bar, means for holding said bar in various longitudinal and pivotal adjustments, a swiveled arm on said slide bar, a pulley in said arm, means for holding said arm in adjusted position, a supplemental pulley, and a belt engaging said pulleys.

8. In a belt gearing the combination of stepped driving and driven pulleys disposed at different angles, a pivoted slide bar, means for holding said bar in various longitudinal and pivotal adjustments, guide pulleys, means for supporting said guide pulleys on said bar, means for adjusting one of said pulleys at an angle to said slide, and a belt engaging said pulleys.

9. A belt gearing comprising stepped driving and driven pulleys disposed at different angles, a pivoted slide bar, means for holding said bar in various longitudinal and pivotal adjustments, a swiveled arm supported by said slide bar, means for holding said arm in adjusted position, a guide pulley on said swiveled arm, a guide pulley on said slide bar, and a belt engaging said pulleys.

10. A belt gearing comprising driving and driven pulleys disposed at different angles, one of said pulleys being a cone or stepped pulley, a pivoted slide bar, means for holding said bar in various longitudinal and pivotal adjustments, a swiveled arm in the form of an angular lever pivoted on slide bar, a guide pulley supported on one arm of said lever, means engaging the other arm thereof for adjusting the angle of said guide pulley, a supplemental guide pulley, and a belt engaging said pulleys.

11. A belt gearing comprising driving and driven pulleys disposed at different angles, one of said pulleys being a cone or stepped pulley, a pivoted slide bar, means for holding said bar in various longitudinal and pivotal adjustments, a swiveled arm in the form of an angular lever pivoted on said slide bar, a guide pulley supported on one arm of said lever, an angular rotary stop on said lever for adjusting the angle of said guide pulley, a supplemental guide pulley, and a belt engaging said pulleys.

In testimony that I claim the following as my invention, I have signed my name in presence of two subscribing witnesses.

FRIEDRICH BERNHARD FISCHER.

Witnesses:
OTTO WOLFF,
PAUL ARRAS.

Copies of this patent may be obtained for five cents each, by addressing the "Commissioner of Patents, Washington, D. C."